US009083645B2

(12) United States Patent
Janardhanan et al.

(10) Patent No.: US 9,083,645 B2
(45) Date of Patent: Jul. 14, 2015

(54) SYSTEMS AND METHODS PROVIDING REVERSE PATH FORWARDING COMPLIANCE FOR A MULTIHOMING VIRTUAL ROUTING BRIDGE

(75) Inventors: Pathangi Narasimhan Janardhanan, Chennai (IN); Ramasubramani Mahadevan, Chennai (IN); Anoop Ghanwani, Rocklin, CA (US); Shivakumar Sundaram, Chennai (IN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 13/607,076

(22) Filed: Sep. 7, 2012

(65) Prior Publication Data

US 2014/0071987 A1 Mar. 13, 2014

(51) Int. Cl.
*H04L 12/753* (2013.01)
*H04L 12/751* (2013.01)
*H04L 12/721* (2013.01)
*H04L 12/761* (2013.01)
*H04L 12/705* (2013.01)

(52) U.S. Cl.
CPC .............. *H04L 45/48* (2013.01); *H04L 45/16* (2013.01); *H04L 45/18* (2013.01); *H04L 45/66* (2013.01)

(58) Field of Classification Search
CPC ......... H04L 45/00; H04L 45/12; H04L 45/24; H04L 45/50; H04L 45/74; H04L 45/745; H04L 12/66; H04L 12/4633; H04L 41/12; H04L 41/0803; H04L 47/10; H04L 47/12; H04L 47/125; H04W 24/02; H04W 84/18
USPC .................. 370/235, 254–256, 390–392, 401
See application file for complete search history.

(56) References Cited

U.S. PATENT DOCUMENTS

| | | | |
|---|---|---|---|
| 7,398,322 B1* | 7/2008 | Perlman | 709/239 |
| 7,760,668 B1* | 7/2010 | Zinjuvadia | 370/256 |
| 7,787,480 B1* | 8/2010 | Mehta et al. | 370/401 |
| 8,331,360 B1* | 12/2012 | Ashwood-Smith et al. | 370/389 |
| 8,355,348 B1* | 1/2013 | Miller et al. | 370/256 |
| 2002/0118647 A1* | 8/2002 | Maeno | 370/238.1 |
| 2002/0169833 A1* | 11/2002 | Tani et al. | 709/205 |
| 2004/0037279 A1* | 2/2004 | Zelig et al. | 370/390 |
| 2005/0005029 A1* | 1/2005 | He et al. | 709/249 |
| 2006/0221868 A1* | 10/2006 | de Heer et al. | 370/257 |
| 2007/0263554 A1* | 11/2007 | Finn | 370/256 |
| 2008/0159277 A1* | 7/2008 | Vobbilisetty et al. | 370/357 |
| 2008/0225864 A1* | 9/2008 | Aissaoui et al. | 370/401 |
| 2009/0185571 A1* | 7/2009 | Tallet | 370/401 |
| 2010/0061269 A1* | 3/2010 | Banerjee et al. | 370/254 |

(Continued)

FOREIGN PATENT DOCUMENTS

WO WO 2011113393 A2 * 9/2011

*Primary Examiner* — Edan Orgad
*Assistant Examiner* — Steven Willmore
(74) *Attorney, Agent, or Firm* — Haynes and Boone, LLP

(57) ABSTRACT

An information handling system is provided. The information handling system includes a plurality of routing bridges coupled to at least one node. The node may be multihomed and logically coupled to the rest of the information handling system through a virtual routing bridge. Methods and systems are provided to allow multicast packets originating behind the virtual routing bridge to be properly handled to comply with reverse path forwarding. This may be accomplished by creating and selectively using a plurality of routing trees that include the paths between the virtual routing bridge and neighboring physical routing bridges.

17 Claims, 4 Drawing Sheets

(56) References Cited

U.S. PATENT DOCUMENTS

| | | | |
|---|---|---|---|
| 2010/0067374 A1* | 3/2010 | Elangovan et al. | 370/230 |
| 2010/0165995 A1* | 7/2010 | Mehta et al. | 370/400 |
| 2011/0061094 A1* | 3/2011 | Salkewicz | 726/4 |
| 2011/0280572 A1* | 11/2011 | Vobbilisetty et al. | 398/45 |
| 2011/0299536 A1* | 12/2011 | Cheng et al. | 370/392 |
| 2012/0106347 A1* | 5/2012 | Allan et al. | 370/238 |
| 2012/0120803 A1* | 5/2012 | Farkas et al. | 370/235 |
| 2012/0163164 A1* | 6/2012 | Terry et al. | 370/221 |
| 2012/0320926 A1* | 12/2012 | Kamath et al. | 370/401 |
| 2013/0003733 A1* | 1/2013 | Venkatesan et al. | 370/390 |
| 2013/0003738 A1* | 1/2013 | Koganti et al. | 370/392 |
| 2013/0018999 A1* | 1/2013 | Merrill et al. | 709/223 |
| 2013/0148663 A1* | 6/2013 | Xiong | 370/392 |
| 2013/0266011 A1* | 10/2013 | Nachum et al. | 370/392 |
| 2013/0279323 A1* | 10/2013 | Allan | 370/225 |
| 2013/0336164 A1* | 12/2013 | Yang et al. | 370/255 |
| 2014/0036924 A1* | 2/2014 | Christenson | 370/395.53 |

\* cited by examiner

SYSTEMS AND METHODS PROVIDING REVERSE PATH FORWARDING COMPLIANCE FOR A MULTIHOMING VIRTUAL ROUTING BRIDGE

BACKGROUND

1. Technical Field

The present disclosure is related to information handling systems. In particular, embodiments disclosed herein are related to layer two routing of multicast packets from multi-homed devices in a TRILL network.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems, such as TRILL (transparent interconnect of lots of links) networks may provide unique benefits over other network implementations. However, providing services that are normally identified by the MAC addresses of the nodes from multiple nodes is not straightforward. This is particularly true where the nodes may be multihomed and may send multicast packets through the network. Therefore, what is needed is a system and method for providing such capabilities.

SUMMARY

Consistent with some embodiments, there is provided an information handling system. The information handling system may include a first physical bridging device, which may have a link state database. The link state database may include a logical topology of a network. The information handling system may also include a virtual bridging device, the virtual bridging device being provided by the first physical bridging device, which may be configured to identify a routing tree in the link state database. The routing tree may contain a logical link between the virtual bridging device and the first physical bridging device;

Consistent with some embodiments, there is further described a method for ensuring reverse path forwarding compliance in an information handling system that includes a virtual routing bridge. The method may include recognizing a plurality of routing bridges in a network, with the plurality of routing bridges including at least one virtual routing bridge. The method may also include recognizing a logical topology of the plurality of routing bridges in the network, determining if each of the plurality is a virtual routing bridge or a physical routing bridge, and computing a plurality of routing trees for the network. The plurality of routing trees may include a routing tree for each topological link existing between one of the determined virtual routing bridges and one of the determined physical routing bridges.

Other embodiments may provide another method for providing reverse path forwarding compliance in an information handling system that includes a virtual routing bridge. The method may include receiving a packet at a physical routing bridge from a node, determining that the packet is associated with the virtual routing bridge, determining that the packet is a multicast packet, selecting a routing tree for the multicast packet, and encapsulating the packet with a header including an identifier of the selected routing tree in an egress RBridge address field of the header.

These and other embodiments will be described in further detail below with respect to the following figures.

Figure 1B:
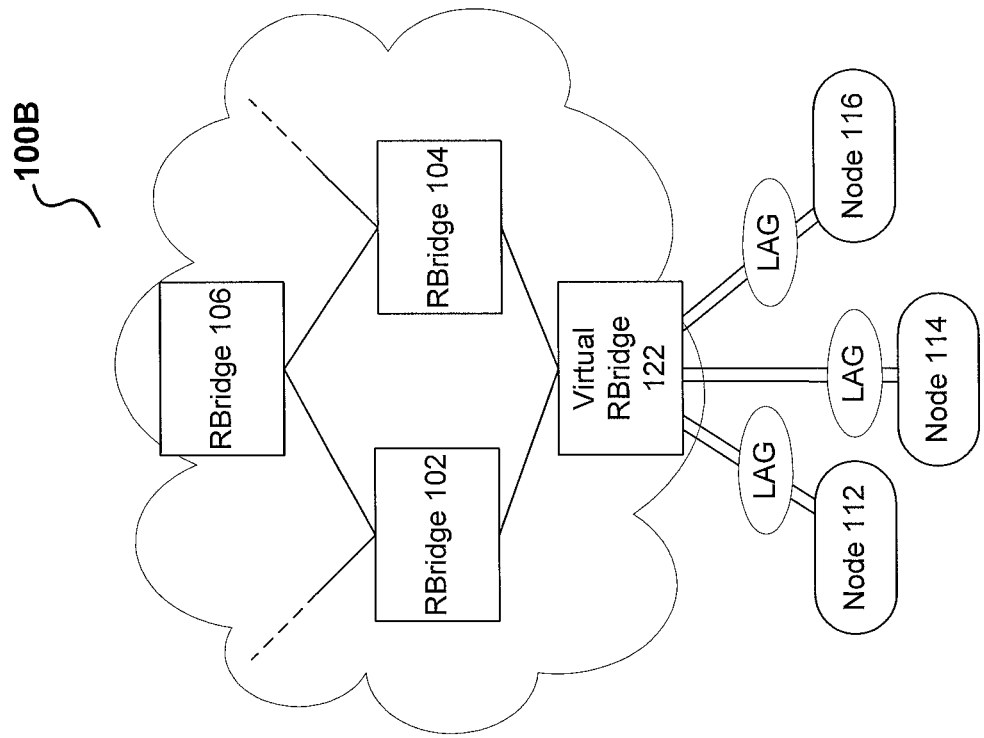
FIG. 1B depicts an information handling system including a plurality of routing bridges and multihomed nodes coupled to a TRILL network using a virtual routing bridge.

In the drawings, elements having the same designation have the same or similar functions. The drawings may be better understood when viewed in connection with the following detailed description.

DETAILED DESCRIPTION

In the following description, specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
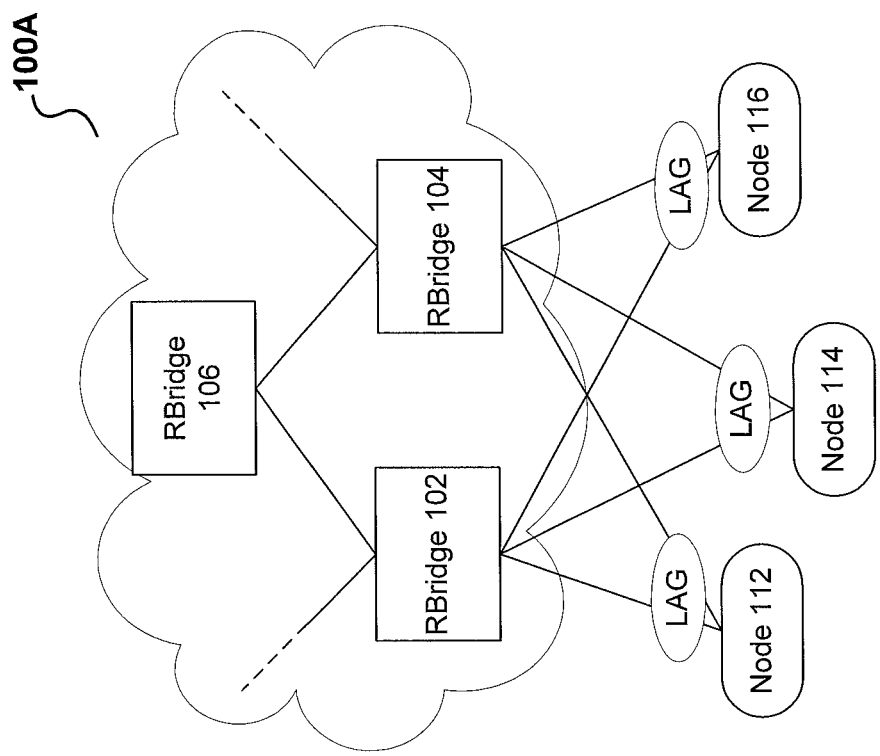
FIG. 1A depicts an information handling system composed of plurality of routing bridges and multihomed nodes coupled to the plurality.

FIG. 1A shows an information handling system including a plurality of bridging devices. Each of the bridging devices may include one or more computer processors, a plurality of network interfaces, and memory. The one or more computer processors may execute instructions stored in the memory to control the flow of packets through the network interfaces of the bridging device. In addition, the one or more computer processors may provide various modules, which may be software or hardware modules, that may examine packet headers and make forwarding determination based on link state packets stored in the bridging device's memory. The link state packets may include information providing a topology of the information handling system of which the bridging device is a part. In some embodiments, the information handling system is a Transparent Interconnect of Lots of Links (TRILL) type network 100A. The TRILL protocol is a protocol defined by the Internet Engineering Task Force. In such embodiments, information handling system 100A (also called network 100A herein for convenience) may include a plurality of routing bridge devices. Routing bridge devices (RBridges) are network devices that implement the TRILL protocol.

As depicted in FIG. 1A, network 100A includes bridging devices 102, 104, and 106. Some embodiments of network 100A may contain many more bridging devices. In some embodiments, bridging devices 102, 104, and 106 are RBridges. Such embodiments may be discussed predominantly herein, with the bridging devices 102, 104, and 106 referred to as RBridges 102, 104, and 106, but the scope of the disclosure should not be understood as being so limited. Network 100A also includes a plurality of nodes, such as nodes 112, 114, and 116. Nodes 112, 114, and 116 are depicted as being in directly linked communication with RBridges 102 and 104, but not with RBridge 106. In practice, network 100A may include many more RBridges and many more nodes, which may be hosts and/or bridges, but for clarity and ease of description the numbers of nodes and RBridges has been limited as depicted.

Consistent with some embodiments, nodes 112, 114, and 116 may be multihomed nodes, meaning that these nodes are served by more than one link to network 100A. These nodes are linked to the rest of network 100 through RBridge 102 and also through RBridge 104. Multihoming may provide increased reliability for a network service, since a failure of one link may not terminate a service entirely. Additionally, multihoming may be used to provide load balancing of network traffic to and from a node. Each of nodes 112, 114, and 116 may use a link aggregation group (LAG) to handle the two communication links to both RBridges.

A packet originating at node 112 that has a destination node accessible at RBridge 106 may pass through either of RBridges 102 and 104. When the packet reaches either RBridge 102 or 104, the receiving RBridge will encapsulate the packet for transmission through the network. Encapsulation may include adding a TRILL header onto the packet; the TRILL header includes an ingress RBridge address field and an egress RBridge address field. The TRILL header may include an identifier, or nickname, for RBridge 102 as the ingress RBridge address and an identifier, or nickname, of RBridge 106 as the egress RBridge address. The packet may be forwarded from the RBridge 102 to RBridge 106, which may, since it is the egress RBridge, decapsulate the packet and deliver to the destination node (not depicted). If the node 112 had sent the packet to RBridge 104, than RBridge 104 would have done the same operations described for RBridge 102, except that in such a case the ingress RBridge address would have been set to an identifier of RBridge 104. This behavior may lead to a "MAC move" as the rest of the network learns that the media access control (MAC) address of node 112 originates behind RBridge 104 in this latter example, after it learned from the former example that the MAC address of node 112 originate behind RBridge 102. If a packet is then sent to the other RBridge, the whole network may register a new topology describing node 112's position as being behind that other RBridge.

If the node available at RBridge 106 needs to send a packet to node 114, the following may occur. The node may transmit its packet to RBridge 106, which may determine that the destination of the node is accessible through both RBridge 102 and RBridge 104 and may determine to which of RBridge 102 and 104 to send the packet. RBridge 106 may determine to send the packet to node 114 through RBridge 104. RBridge 106 may encapsulate the packet accordingly and forward the packet to RBridge 104, which may then decapsulate the packet, recognize a destination MAC address of the packet as a MAC address associated with node 114, and transmit the decapsulated packet to node 114.

In the examples described above, the packets may similarly have been transmitted and received by any of nodes 112, 114, and 116, and may have traveled through either RBridge 102 or 104, according to the destination and source addresses.

FIG. 1B includes many elements of FIG. 1A, but further includes a virtual RBridge 122 in network 100B. Virtual RBridge 122 may be provided in order to ensure that "MAC moves" as described above does not occur for multihomed nodes. As shown in FIG. 1B, to send a packet to node 112 from RBridge 106, the packet may be encapsulated in a TRILL frame with a TRILL header. The TRILL header may include RBridge 106 as the ingress RBridge address and virtual RBridge 122 as the egress RBridge address. Since, in the logical topology of the network virtual RBridge appears to be accessible through either RBridge 102 or 104, RBridge 106 determines to which of these RBridges to forward the packet. In some instances, RBridge 106 may forward the encapsulated packet to the closest RBridge, but in this case both RBridges 102 and 104 are equidistant. Therefore, RBridge 106 may employ a different decision criterion, such as a hashing algorithm, to distribute traffic over equal-cost multipathing (ECMP) paths and link aggregation group members.

For example, RBridge 106 may determine to forward the packet to virtual RBridge 122 through RBridge 102. When RBridge 102 receives the packet, it may recognize virtual RBridge 122 as the egress RBridge address, and then decapsulate the packet on behalf of virtual RBridge 122. After decapsulation, RBridge 102 may determine a MAC destination address of the packet, which in this case, is a MAC address for node 112. RBridge 102 may then deliver the packet to the node 112 through the associated port.

To send a unicast packet from node 116 to a node attached to RBridge 106, the packet may be sent to either RBridge 102 or 104. Supposing the packet is sent to RBridge 102, RBridge 102 may recognize that this packet comes from a port served by or associated with virtual RBridge 122. RBridge 102 may then encapsulate the packet using an identifier or nickname of virtual RBridge 122, instead of an identifier of RBridge 102, as the ingress RBridge address, and using an identifier of RBridge 106 as the egress address. The rest of the process may be as described above in connection with network 100A.

However, certain complications may arise when attempting to handle a multicast packet originating from one of the nodes logically situated behind virtual RBridge 122. This is particularly true with regard to the reverse path forwarding check mechanisms.

Figure 2B:
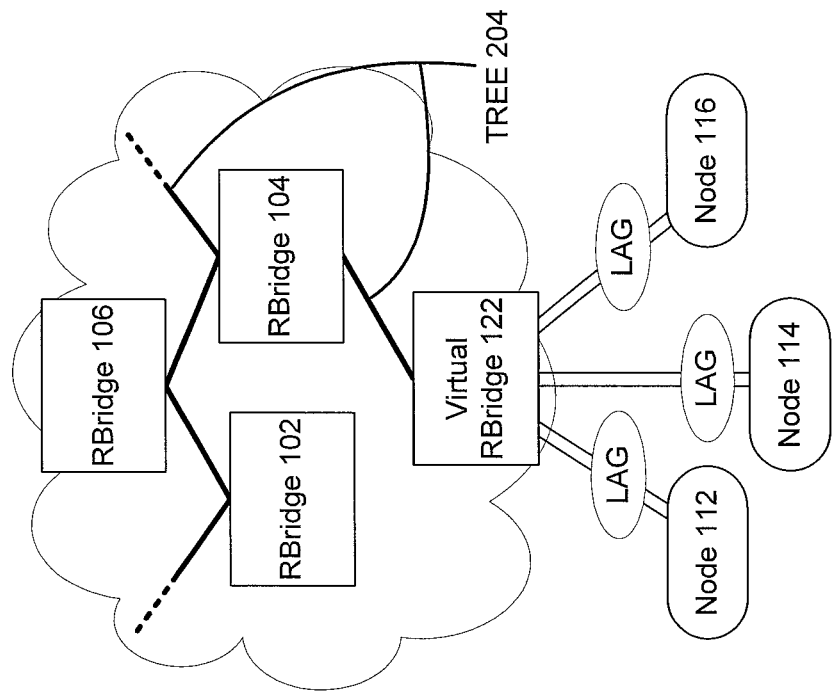
FIG. 2B depicts an information handling including another potential routing tree for some multicast packets entering the network from the virtual routing bridge.
Figure 2A:
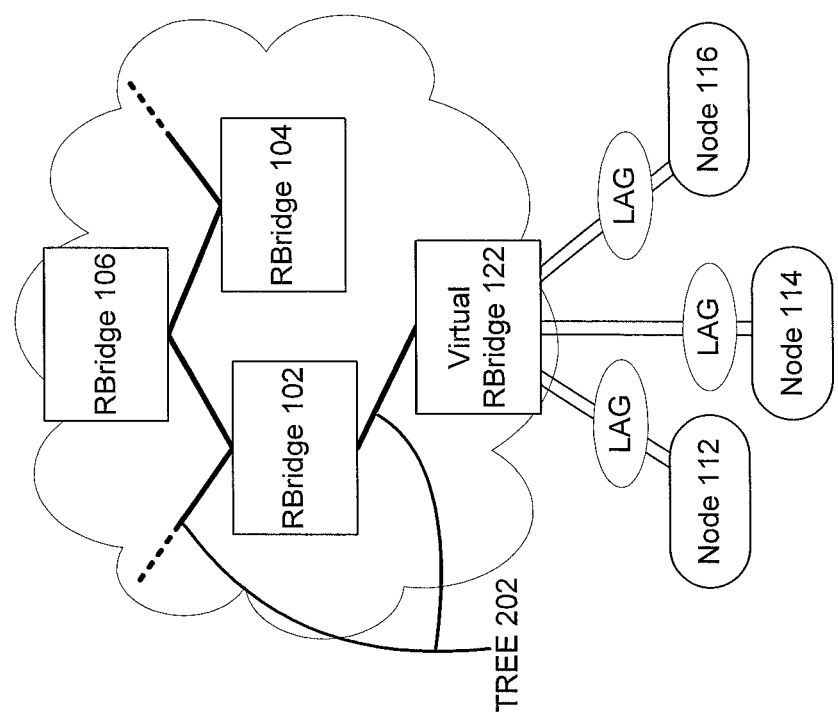
FIG. 2A depicts an information handling system including a potential routing tree for some multicast packets entering the network from a virtual routing bridge.

FIGS. 2A and 2B depict two different routing trees that may be implemented in order to satisfy reverse path forwarding (RPF) check mechanisms used on network 100B. Reverse path forwarding mechanisms may be used in a network to ensure loop-free forwarding of multicast packets. When a multicast packet is received and recognized by an ingress RBridge, that ingress RBridge may encapsulate the packet using its identifier as the ingress RBridge address field, and using a routing tree as the egress RBridge address field rather than an identifier for a single RBridge. The routing tree describes the path the packet should travel through the network to ensure all RBridges in the network receive the packet without receiving duplicate packets, which may cause loops. These loops can consume network bandwidth and cause service problems.

When non-ingress RBridges receive the packet as it is forwarded through the routing tree, they will use an RPF check mechanism to verify that the received packet arrived in accordance with the tree specified in the header's egress RBridge address field. If the packet was not received from an RBridge that comports with the routing tree, the packet will be dropped to ensure that no loops are created in the network.

Referring to FIG. 2A, if node 114 sends a multicast packet to RBridge 102, RBridge 102 may encapsulate it using virtual RBridge 122 as the ingress RBridge address, because the port on which RBridge 102 received the multicast packet is associated with virtual RBridge 122. Further, RBridge 102 may use an identifier for tree 202 in the egress RBridge address field, rather than an identifier of a single RBridge, because it is a multicast packet. The packet may be forwarded across tree 202 without a problem.

However, if node 114 then sends a multicast packet to RBridge 104, there may be problems with the RPF check if RBridge 104 encapsulates the packet using an identifier of the same tree as before, tree 202, in the egress address field. RBridge 104 may forward the encapsulated packet to RBridge 106, but RBridge 106 may recognize that the egress address of the packet is tree 202 and that RBridge 104 forwarded the packet to RBridge 106, not RBridge 102 as indicated by tree 202. Since the packet received by RBridge 106 did not arrive on a path included in the tree indicated in the packet's header, the packet may fail the RPF check and the packet may be dropped by RBridge 106. If the packet is dropped, any nodes coupled to RBridge 106 will not receive the packet, and RBridge 106 will not forward the packet to any other RBridges. Thus, a different tree may be needed for each topological link between a virtual RBridge and any logically coupled physical routing bridges in order to avoid failing the RPF check.

FIG. 2B depicts a tree 204 for the same network as in FIG. 2A. Unlike, tree 202, tree 204 includes the logical connection between virtual RBridge 122 and RBridge 104, and excludes the logical connection between virtual RBridge 122 and RBridge 102. With an identifier of tree 204 in the egress RBridge address, when the encapsulated packet is forwarded to RBridge 106 from RBridge 104, RBridge 106 will recognize that the packet arrived from a path that is included in tree 204. In operation, when a multicast packet from one of the multihomed nodes is received by RBridge 104, RBridge 104 may encapsulate it using an identifier for tree 204 as the egress RBridge address. Therefore, with tree 204 in the egress RBridge address and the packet being forwarded from RBridge 104 to 106, the packet may pass the RPF check since the packet arrived at RBridge 106 through a path indicated by the tree in its egress RBridge address. RBridge 106 may decapsulate the packet for all nodes local to RBridge 106 and may also forward the packet along the remainder of the path described by tree 204.

Embodiments include a system that allows for the creation and selection of trees, such as tree 202 and 204, that will allow a multicast packet to consistently pass an RPF check. As depicted in FIGS. 1B, 2A, and 2B, the system may include a plurality of physical routing bridges, such as RBridge 102, 104, and 106, and at least one virtual RBridge, such as virtual RBridge 122. The system may further include at least one node that is actually coupled with at least two of the plurality of routing bridges, i.e. is a multihomed node. As depicted, nodes 112, 114, and 116 are all actually coupled to both RBridge 102 and RBridge 104, with a link aggregation group to manage the connections or links. However, as in FIG. 1B, these nodes appear logically or topologically coupled to RBridges 102 and 104 through virtual RBridge 122.

Embodiments of the information handling system may further provide for enhanced intermediate-system-to-intermediate-system (IS-IS) advertisements, so that in the topology of the network as available in the link state database of each RBridge, all physical RBridges may recognize that each virtual RBridge appearing in the topology is a special type of RBridge, e.g. a virtual RBridge. Each virtual RBridge may be recognized by a virtual nickname or identifier that serves both as a unique identifier and as an indication that the virtual RBridge is not a physical RBridge. Since every physical RBridge includes a link state database, this information may be available to all physical RBridges in the network. The link state database on each RBridge can be created and modified by receiving link state packets from other RBridges in the network. Routing trees that are automatically generated so that multicast packets can travel efficiently and safely through the network can be generated according to requirements unique to RBridges of the special type, and routing tree identifiers may also be stored in the link state databases.

To facilitate formation of routing trees, the one or more computer processors of each RBridge may arrange the identifiers of the physical RBridges in ascending order. The identifiers may be unsigned integers for ease of manipulation by the one or more computer processors. For example, each RBridge will include a link between the first physical bridging device in the ascending order and the virtual bridging device in a first routing tree and then will include a link between the second physical bridging device in the ascending order and the virtual bridging device in a second routing tree, and so on. By following the same process, the routing trees generated by one RBridge may be the same as the routing trees generated by another RBridge. The consistent use of the ascending order can continue in this manner until all the necessary routing trees have been computed. Thus, the routing trees may not need to be communicated across the network to each RBridge, but can be uniformly determined by and at each RBridge in the network.

The requirements of the virtual RBridges may cause the automatic tree formation process running on each physical RBridge to ensure that every link between a physical RBridge and a virtual RBridge is represented in at least one tree. As discussed, in practice many more RBridges and virtual RBridges may be present in an operational network. In general, the total number of trees that include a specific virtual RBridge may be equal to the number of RBridges that act on behalf of that virtual RBridge and neighbor it in the network's topology, multiplied by the number of trees present in the real network, e.g. the network as it would be without considering the virtual RBridge.

In addition, some embodiments may cause any RBridge that logically or topologically neighbors a virtual RBridge to select a tree or the tree that includes the link between the virtual RBridge and that neighboring RBridge. This may ensure that multicast packets sent as if from a virtual RBridge include the proper tree as an egress address in order to pass RPF checks as the packet is forwarded. For example, if a packet is "sent" from virtual RBridge 122 to RBridge 102, tree 202 may be selected as an egress address of the packet. And if a packet is "sent" from virtual RBridge 122 to RBridge 104, tree 204 may be selected as the egress address. These packets will both pass RPF checks, even if they both originate at the same multihomed node.

Figure 3:
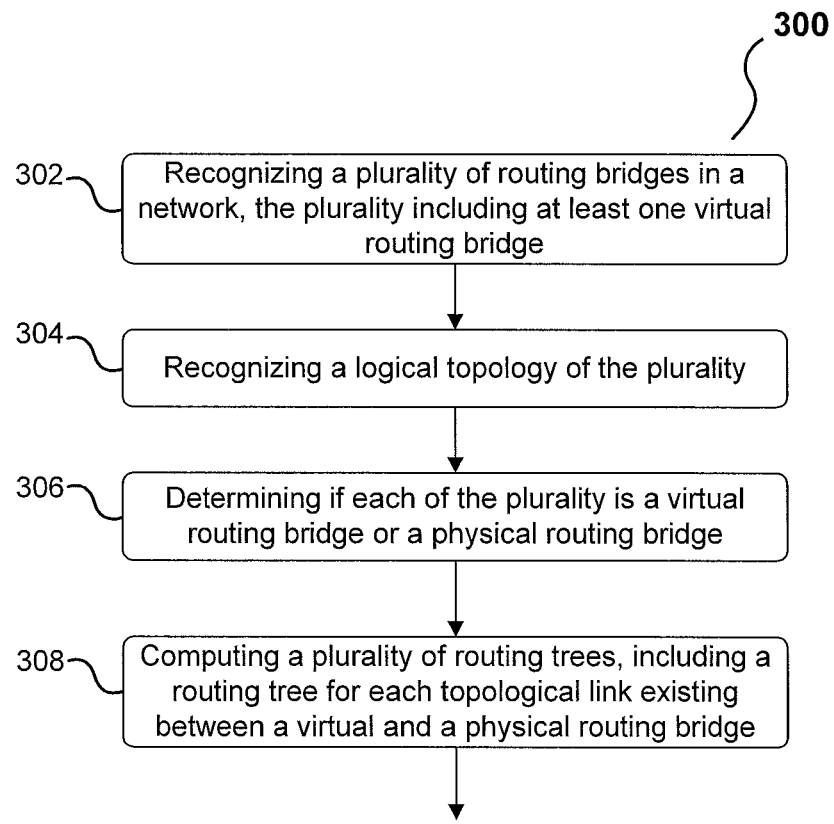
FIG. 3 is a flowchart of a method for generating routing trees to ensure reverse path forwarding check compliance for multicast packets originating behind a virtual routing bridge.

FIG. 3 is a flowchart of a method 300 for providing RPF check compliance in an information handling system such as that depicted in FIG. 1B. Method 300 may begin in step 302, when an RBridge in a network recognizes a plurality of other RBridges in the network and the plurality includes at least one virtual RBridge. In step 304, the RBridge may recognize a logical topology of the network indicating the logical connections between the RBridge and the plurality and among the plurality, including the at least one virtual RBridge. In step 306, the RBridge may determine which RBridges in the plurality are virtual as opposed to physical RBridges. The RBridge may then compute a plurality of routing trees to allow for multicasting packets, including a routing tree for each logical link in the topology between a virtual and a physical RBridge.

In order to better understand method 300, reference can be made to FIGS. 1B, 2A, and 2B. For example, RBridge 102 may transmit and exchange link state packets with the RBridges 104 and 106. These link state packets may include, automatically or by manual configuration, a link state packet that indicates that RBridge 122 is a virtual RBridge and that virtual RBridge 122 neighbors RBridge 102. Thus, RBridge 102 may recognize the plurality of RBridges (step 302). The link state packets so exchanged may additionally indicate the connection between RBridges in the network, including virtual RBridge 122. The link state packets may include identity and nearest neighbor information from which a module on RBridge 102 may compute a topological representation of the network (step 304). Corresponding modules on RBridge 104 and 106 may also compute the same network topology.

Through the use of enhanced IS-IS advertisements that also indicate whether each RBridge in the topology is a physical RBridge or a virtual RBridge, RBridge 102 may determine that RBridge 122 is a virtual RBridge and that RBridges 104 and 106 are physical RBridges (step 306). Based on the determination that RBridge 122 is a virtual RBridge and RBridges 104 and 106 are physical RBridges, RBridge 102 may recognize the link between virtual RBridge 122 and RBridge 104, as well as the link between virtual RBridge 122 and RBridge 102, as being special status links to be treated differently in routing tree formation. RBridge 102 may also recognize the link between RBridge 102 and 106, and the link between RBridge 104 and 106. RBridge 102 may recognize additional links as may exist in the network. In practice, RBridge 102, or a module provided by a computer processor in RBridge 102, may then compute a plurality of routing trees based on the topology, ensuring the inclusion of tree 202 of FIG. 2A and tree 204 of FIG. 2B: tree 202 for multicast packets sent by RBridge 102 on behalf of virtual RBridge 122 and tree 204 for multicast packets sent by RBridge 104 on behalf on virtual RBridge 122.

Figure 4:
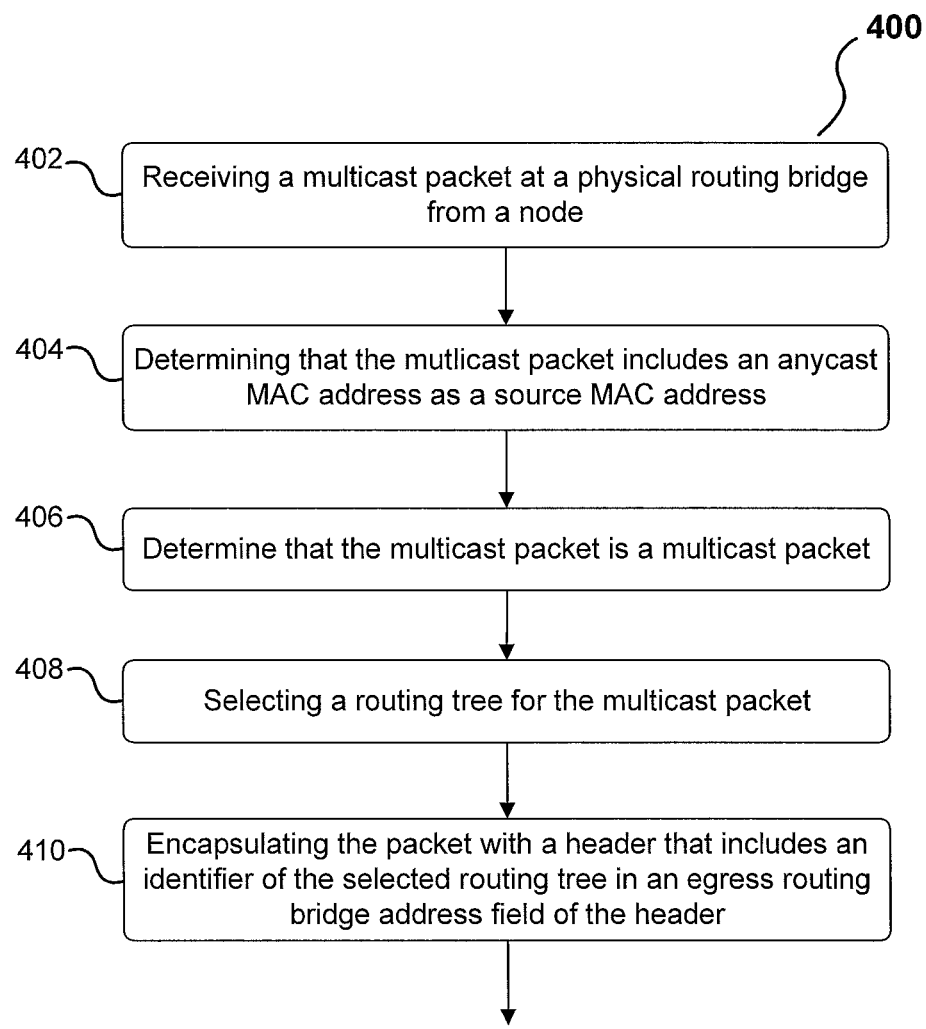
FIG. 4 is a flowchart of a method for selecting and using routing trees so as to ensure reverse path forwarding check compliance for multicast packets originating behind a virtual routing bridge.

FIG. 4 is a flowchart of a method 400 for providing RPF check compliance in an information handling system that includes a virtual RBridge. Method 400 may begin in step 402 when an ingress RBridge receives a packet from a node. The RBridge may determine that the ingress port indicates that it should be sent with an identifier of the virtual RBridge as its ingress RBridge address in step 404. In step 406, the RBridge may determine that the packet is a multicast packet. Then in step 408, the RBridge may select a routing tree by which to forward the multicast packet. The RBridge may afterward encapsulate the packet with a header that includes an identifier for the selected routing tree in the header's egress RBridge address field, in step 410.

In the information handling systems of FIGS. 2A and 2B, method 400 may operate in the following manner. RBridge 104 may receive a multicast packet from any one of nodes 112, 114, and 116 (step 402). RBridge 104 may determine based on the ingress port, that the packet is associated with virtual RBridge 122 (step 404). By detecting that the multicast bit is enabled in the packet, RBridge 104 may determine that the multicast packet is a multicast packet, and therefore should be handled as such (step 406). RBridge 104 may then select a routing tree from among a plurality of possible routing trees (step 408). In selecting the routing tree, RBridge 104 may select a routing tree that includes a link between RBridge 104 and virtual RBridge 122 from a plurality of potential routing trees for the network. The plurality of potential routing trees may include various paths that include virtual RBridge 122 and RBridges 102, 104, and 106 and any other RBridges in the network. The plurality of routing trees may have been formed as described above in connection with method 300 of FIG. 3.

After the selection of the routing tree, RBridge 104 may encapsulate the multicast packet with a header that includes an identifier of the selected routing tree in the header's egress RBridge address field (step 410). Additionally, RBridge 104 may include an identifier of virtual RBridge 122 in the header's ingress RBridge address field. Thus, the multicast packet may be seen by the network as originating behind virtual RBridge 122 and may follow a routing tree that includes the link between virtual RBridge 122 and RBridge 104, and thus may pass RPF checks as it is propagated through the network.

Embodiments within the scope of this disclosure include non-transient, computer readable media which contain instructions, that when executed by a computer processor, such as the one or more computer processors on a bridging device or routing bridge device, may cause the device to perform steps according to methods 300 and/400 as described above.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
    a first physical bridging device coupled to a node, the first physical bridging device being configured to receive a multicast packet from a node, the first physical bridging device including a link state database, the link state database including a logical topology of a network;
    a virtual bridging device, the virtual bridging device being provided by the first physical bridging device and being logically coupled to a second physical bridging device in the logical topology of the network, the second physical bridging device being coupled to the node and being associated with the virtual bridging device, and wherein the first physical bridging device is configured to:

select a routing tree identifier for the multicast packet, wherein selecting the routing tree identifier comprises selecting the routing tree identifier for a routing tree that includes a topological link between the physical bridging device and the virtual bridging device from among a plurality of routing trees, only one of the plurality of routing trees including the topological link between the physical bridging device and the virtual bridging device.

2. The system of claim 1, wherein the logical topology indicates logical links between the virtual bridging device and the first and second physical bridging devices.

3. The system of claim 1, wherein the logical topology is created by using an intermediate-system-to-intermediate-system advertising enhancement to distinguish any virtual bridging devices from physical bridging devices.

4. The system of claim 1, further comprising a link state database on each of the first and second physical bridging devices, each of the link state databases containing a plurality of routing trees for the logical topology, the plurality of routing trees including a routing tree for a first topological link between the virtual bridging device and the first physical bridging device and for a second topological link between the virtual bridging device and the second physical bridging device.

5. The system of claim 4, wherein both the first physical bridging device and the second physical bridging device are configured to:
receive a packet from the node;
detect that the packet from the node is associated with the virtual bridging device;
determine that the packet is a multicast packet; and
encapsulate the packet with a header, the header including an identifier of the virtual bridging device in an ingress address and a selected routing tree in an egress address.

6. The system of claim 5, wherein the selected routing tree includes the first topological link whenever the first physical bridging device receives the multicast packet, and includes the second topological link whenever the second physical bridging device receives the multicast packet.

7. The system of claim 4, wherein the plurality of routing trees includes a routing tree for every topological connection between each of a plurality of physical bridging devices and each of a plurality of virtual bridging devices present in the network.

8. The system of claim 1, wherein the physical bridging device is a routing bridge device.

9. A method for providing reverse path forwarding compliance in an information handling system that includes a virtual bridging device, the method comprising:
recognizing a plurality of bridging devices in a network, the plurality of bridging devices including at least one virtual bridging device, the at least one virtual bridging device being logically coupled to a first physical bridging device and a second physical bridging device in a logical topology of the network, the first and second physical bridging devices each being coupled to a node and being associated with the at least one virtual bridging device; determining a logical topology of the plurality of bridging devices in the network;
determining if each of the plurality of bridging devices is a virtual bridging device or a physical bridging device by querying a link state database; and
computing a plurality of routing trees for the network using a computer processor, the plurality of routing trees including a routing tree for each topological link existing between one of the determined virtual bridging devices and one of the determined physical bridging devices; and
selecting a routing tree identifier for a multicast packet, wherein selecting the routing tree identifier comprises selecting the routing tree identifier for a routing tree that includes a topological link between one of the physical bridging devices and one of the virtual bridging devices from among the plurality of routing trees, only one of the plurality of routing trees including the topological link between the one of the physical bridging devices and the one of the virtual bridging devices.

10. The method of claim 9, further comprising enhancing an IS-IS advertisement system such that a virtual bridging device may be recognized by a virtual nickname, the virtual nickname indicating identity and status as a virtual bridging device.

11. The method of claim 9, wherein computing the plurality of routing trees for the network comprises arranging the determined physical bridging devices in an ascending order by bridging device identifier, the bridging device identifier being a numerical identifier for each of the plurality of bridging devices in the network.

12. The method of claim 11, wherein computing the plurality of routing trees for the network further comprises: including in a first routing tree a link between the first physical bridging device in the ascending order and the one of the determined virtual bridging devices; and including in a second routing tree a link between the second physical bridging device in the ascending order and the one of the determined virtual bridging devices.

13. The method of claim 9, wherein the logical topology of the plurality of bridging devices includes an indication of whether each of the plurality of bridging devices is a virtual bridging device or a physical bridging device.

14. A method for providing reverse path forwarding compliance in an information handling system that includes a virtual bridging device, the method comprising:
receiving a multicast packet at a first physical bridging device from a node;
determining that the multicast packet is associated with the virtual bridging device, the virtual bridging device being logically coupled to the first physical bridging device and a second physical bridging device in a logical topology of a network, the first and second physical bridging devices each being coupled to the node and being associated with the virtual bridging device;
selecting a routing tree identifier for the multicast packet, wherein selecting the routing tree identifier comprises selecting the routing tree identifier for a routing tree that includes a topological link between the first physical bridging device and the virtual bridging device from among a plurality of routing trees, only one of the plurality of routing trees including the topological link between the physical bridging device and the virtual bridging device; and
encapsulating the packet with a header including the selected routing tree identifier in an egress bridging device address field of the header.

15. The method of claim 14, wherein encapsulating the packet with the header comprises including an identifier for the virtual bridging device in an ingress bridging device address field of the header.

16. The method of claim 14, further comprising:

using an enhanced intermediate-system-to-intermediate-system advertisement to identify a virtual bridging device as a virtual bridging device; and creating a plurality of routing trees, each routing tree including a topological link between the virtual bridging device and a physical bridging device that neighbors the virtual bridging device.

17. The method of claim 14, further comprising:

using an enhanced IS-IS advertisement to identify all of a plurality of virtual bridging devices as virtual bridging devices; and creating a plurality of routing trees from a plurality of virtual bridging devices and a plurality of physical bridging devices, each routing tree including a topological link between each virtual bridging device and a single physical bridging device that neighbors that virtual bridging device.

\* \* \* \* \*